United States Patent
Singh

(10) Patent No.: US 12,248,582 B2
(45) Date of Patent: Mar. 11, 2025

(54) INTELLIGENT APPARATUS TO MONITOR AND AUTO DEPLOY SECURITY POLICY RULES ON CONTAINER BASED CLOUD INFRASTRUCTURE LEVERAGING NFT AND QUANTUM KNOWLEDGE GRAPH

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 220 days.

(21) Appl. No.: 18/109,353

(22) Filed: Feb. 14, 2023

(65) Prior Publication Data
US 2024/0273211 A1 Aug. 15, 2024

(51) Int. Cl.
*G06F 21/57* (2013.01)
*G06N 10/80* (2022.01)

(52) U.S. Cl.
CPC .......... *G06F 21/577* (2013.01); *G06N 10/80* (2022.01); *G06F 2221/034* (2013.01)

(58) Field of Classification Search
CPC . G06F 21/577; G06F 2221/034; G06N 10/80; G06N 20/00
See application file for complete search history.

(56) References Cited

U.S. PATENT DOCUMENTS

| | | | |
|---|---|---|---|
| 10,185,638 B2 | 1/2019 | Duan | |
| 10,210,322 B2 | 2/2019 | Gerebe | |
| 10,460,113 B2 | 10/2019 | Folco et al. | |
| 10,990,677 B2 | 4/2021 | Wiebe et al. | |
| 11,244,231 B2 | 2/2022 | Ma et al. | |
| 11,252,198 B2 | 2/2022 | Viswanathan et al. | |
| 11,783,062 B2 * | 10/2023 | Lounsberry | G06F 21/6218 726/30 |
| 2014/0379323 A1 | 12/2014 | Anastasakos et al. | |
| 2020/0074316 A1 * | 3/2020 | Ma | G06F 16/9024 |
| 2023/0171266 A1 * | 6/2023 | Brunner | H04L 41/16 726/23 |
| 2024/0037439 A1 * | 2/2024 | Werner | G06N 10/40 |

* cited by examiner

*Primary Examiner* — El Hadji M Sall
(74) *Attorney, Agent, or Firm* — Banner & Witcoff, Ltd.

(57) ABSTRACT

Aspects of the disclosure relate to monitoring and deploying security policy rules in in a container-based computing infrastructure. A computing platform may train a quantum knowledge graph based on interactions in a container-based computing infrastructure. The computing platform may generate and deploy, to the container-based computing infrastructure, one or more security rules associated with interactions in the container-based computing infrastructure based on the quantum knowledge graph les. Subsequently, the computing platform may monitor interactions between containers in the container-based computing infrastructure and identify, using the quantum knowledge graph, an anomaly in a first interaction between a first container and a second container. Based on identifying the anomaly, the computing platform may thereafter perform a verification analysis of the first interaction to determine a potential security risk and send, to an administrator computing platform, an alert action configured to be displayed on an interface of the administrator computing platform.

20 Claims, 11 Drawing Sheets

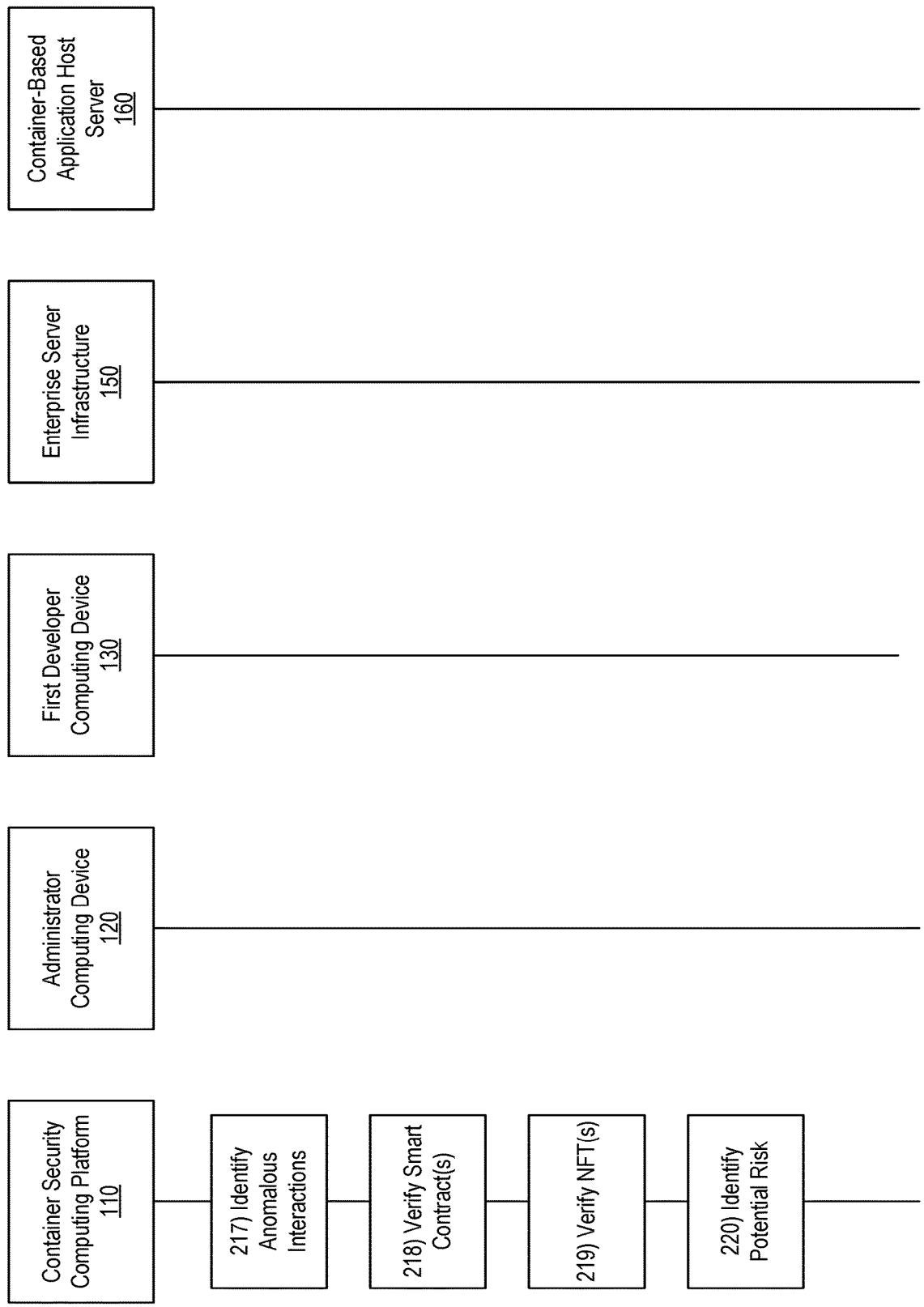

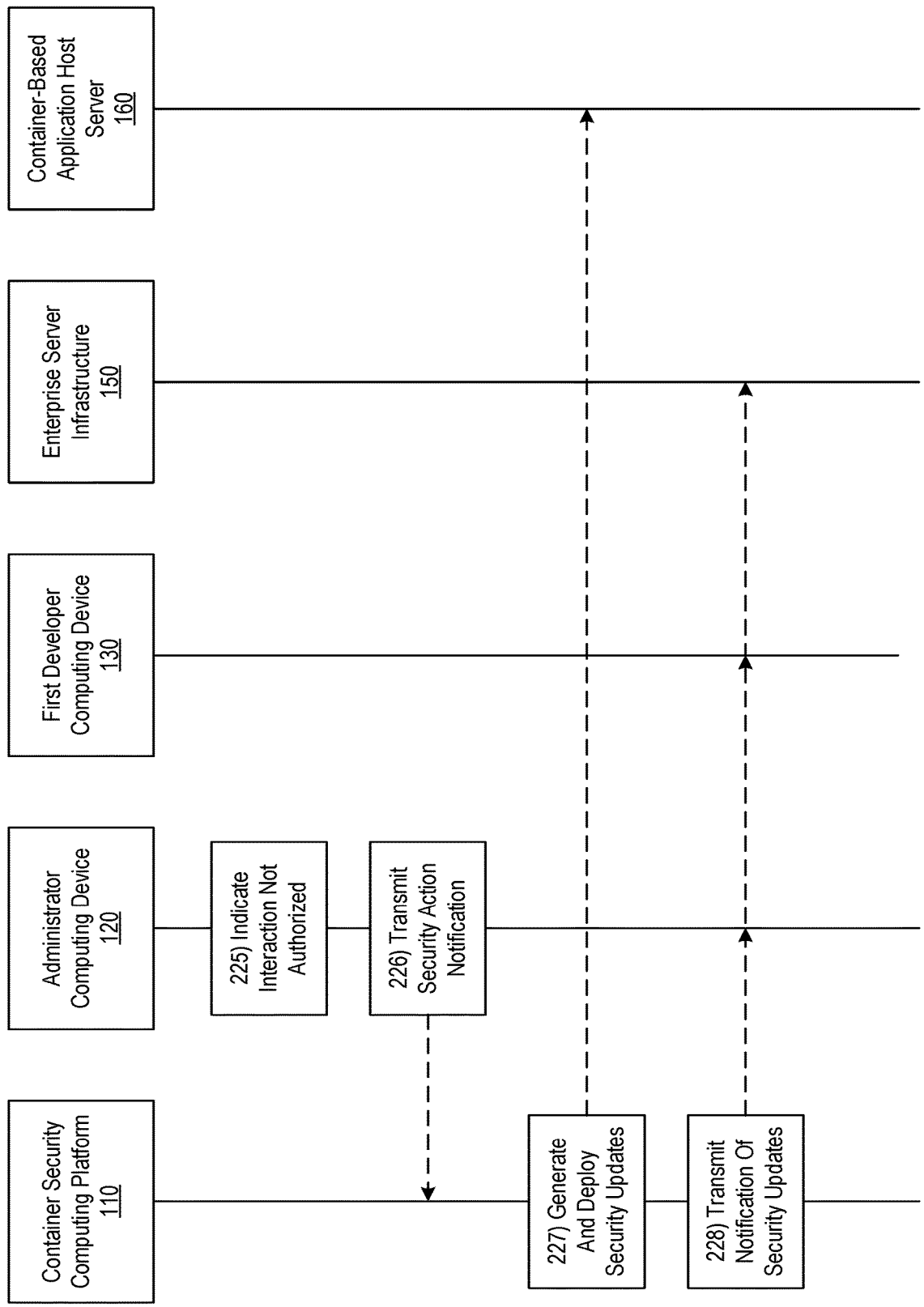

INTELLIGENT APPARATUS TO MONITOR AND AUTO DEPLOY SECURITY POLICY RULES ON CONTAINER BASED CLOUD INFRASTRUCTURE LEVERAGING NFT AND QUANTUM KNOWLEDGE GRAPH

BACKGROUND

Aspects of the disclosure relate to detecting and preventing security threats in a container-based computing infrastructure. In particular, one or more aspects of the disclosure relate to computing platforms that monitor container interactions using quantum knowledge graphs and non-fungible tokens (NFTs) and that automatically deploy security policy rules on a container-based computing infrastructure.

Computing environments that make use of container-based infrastructure provide a setup in which applications may be abstracted from the environment they run in. Decoupling the applications from the environments in which they run allows for easy and consistent deployment of applications regardless of environment. Indeed, such a setup may be run in any number of environments, including private data centers, public cloud infrastructures, personal user computing devices, among other examples. This container-based infrastructure may allow for software developments to be deployed quickly and effectively, even on large scales. However, in some cases, the setup may allow for unrestricted communications among various containers, particularly in view of the number of containers and services running and the ephemeral nature of containers in general, which may pose challenges to implementing networking or firewalling rules adhering to the least privilege principle. This vulnerability may lead to the potential risk of malicious actors intruding on containers, posing as a cybersecurity threat to the enterprise organization employing the container-based infrastructure.

SUMMARY

Aspects of the disclosure provide effective, efficient, scalable, and convenient technical solutions that address and overcome the technical problems associated with monitoring container interactions and deploying security policy rules on a container-based computing infrastructure. In accordance with one or more embodiments of the disclosure, a computing platform comprising at least one processor, a communication interface, and memory storing computer-readable instructions may train a quantum knowledge graph based on interactions in a container-based computing infrastructure. The computing platform may generate one or more security rules associated with interactions in the container-based computing infrastructure based on the quantum knowledge graph and deploy the one or more security rules to the container-based computing infrastructure. The computing platform may then monitor interactions between containers in the container-based computing infrastructure and may subsequently identify, using the quantum knowledge graph, an anomaly in a first interaction between a first container and a second container. Upon identifying the anomaly, the computing platform may perform a verification analysis of the first interaction to determine a potential security risk. Based on the potential security risk, the computing platform may send, via the communication interface, to an administrator computing platform, an alert action configured to be displayed on an interface of the administrator computing platform.

In one or more instances, performing the verification analysis of the first interaction may include identifying a smart contract associated with interactions between the first container and the second container and authenticating the first interaction based on the smart contract. In some instances, performing the verification analysis of the first interaction may include identifying a first non-fungible token (NFT) associated with the first container and a second NFT associated with the second container, authenticating the first container based on the first NFT, wherein the first NFT is configured to certify ownership of the first container, and authenticating the second container based on the second NFT, wherein the second NFT is configured to certify ownership of the second container. The first NFT and the second NFT may be controlled by least one smart contract that includes a set of dynamic security rules for interactions between containers.

In one or more instances, the computing platform may generate and deploy an updated security rule to the container-based computing infrastructure based on the potential security risk of the anomaly not exceeding a risk threshold. In some instances, identifying the anomaly in the first interaction between the first container and the second container may include analyzing container image metadata of the first container and the second container and determining that the first interaction is an anomaly based on the container image metadata and the one or more security rules. In some instances, training the quantum knowledge graph based on interactions in the container-based computing infrastructure may include capturing semantic information relating to interactions between containers.

In one or more instances, generating one or more security rules may include automatically configuring and deploying a system of NFTs and smart contracts to the container-based computing infrastructure. In some instances, training the quantum knowledge graph may include deriving contextual data flow from the quantum knowledge graph using quantum machine learning algorithms. In some instances, the alert action may be configured to cause interactions between the first container and the second container to stop. In some instances, the computing platform may be configured to update the quantum knowledge graph based on ongoing interactions between containers in the container-based computing infrastructure and updates to one or more security rules for the container-based computing infrastructure.

In accordance with one or more embodiments, a method is provided at a computing platform comprising at least one processor, a communication interface, and memory. The method may include training a quantum knowledge graph based on interactions in a container-based computing infrastructure, monitoring interactions between containers in the container-based computing infrastructure, and identifying, using the quantum knowledge graph, an anomaly in a first interaction between containers in the container-based computing infrastructure. Based on identifying the anomaly, a verification analysis of the first interaction may be performed to determine a potential security risk. The method may then send, via the communication interface, to an administrator computing platform, an alert action relating to the potential security risk. The alert action may be configured to be displayed on an interface of the administrator computing platform.

In one or more instances, the method may further include generating one or more security rules relating to interactions in the container-based computing infrastructure based on the quantum knowledge graph and deploying the one or more security rules to the container-based computing infrastructure. In some instances, sending the alert action to the administrator computing platform may occur upon determining that the potential security risk exceeds a risk threshold. In some instances, performing the verification analysis of the first interaction may include identifying a smart contract associated with containers involved in the first interaction and authenticating the first interaction based on the smart contract. The smart contract may include a set of dynamic security rules relating to interactions between containers in the container-based computing infrastructure.

In one or more instances, the method may include performing the verification analysis of the first interaction includes identifying one or more non-fungible tokens (NFTs) associated with containers involved in the first interaction and authenticating the containers involved in the first interaction based on the one or more NFTs. In such instances, each of the one or more NFTs may certify ownership of a respective container of the containers involved in the first interaction. In some instances, the method may further include generating and deploying an updated security rule to the container-based computing infrastructure based on the potential security risk of the anomaly not exceeding a risk threshold.

In one or more instances, the method may further include, based on the potential security risk of the anomaly not exceeding a risk threshold, retraining the quantum knowledge graph based on at least the first interaction. In some instances, generating one or more security rules may include automatically configuring and deploying a system of NFTs and smart contracts to the container-based computing infrastructure.

In accordance with one or more embodiments, one or more non-transitory computer-readable media may be provided storing instructions that, when executed by a computing platform comprising at least one processor, a communication interface, and memory cause the computing platform to train a quantum knowledge graph based on interactions in a container-based computing infrastructure, monitor interactions between containers in the container-based computing infrastructure, and identify, using the quantum knowledge graph, an anomaly in a first interaction between a first container and a second container. Based on identifying the anomaly, the computing platform may perform a verification analysis of the first interaction to determine a level of potential security risk. Based on the level of potential security risk not exceeding a risk threshold, the computing platform may automatically generate and deploy one or more security rules to the container-based computing infrastructure and retrain the quantum knowledge graph based on at least the first interaction. Based on the level of potential security risk exceeding a risk threshold, the computing platform may send, via the communication interface, to an administrator computing platform, an alert action configured to be displayed on an interface of the administrator computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for monitoring container interactions and deploying security rules on a container-based computing infrastructure in accordance with one or more example embodiments;

DETAILED DESCRIPTION

Figure 1A:
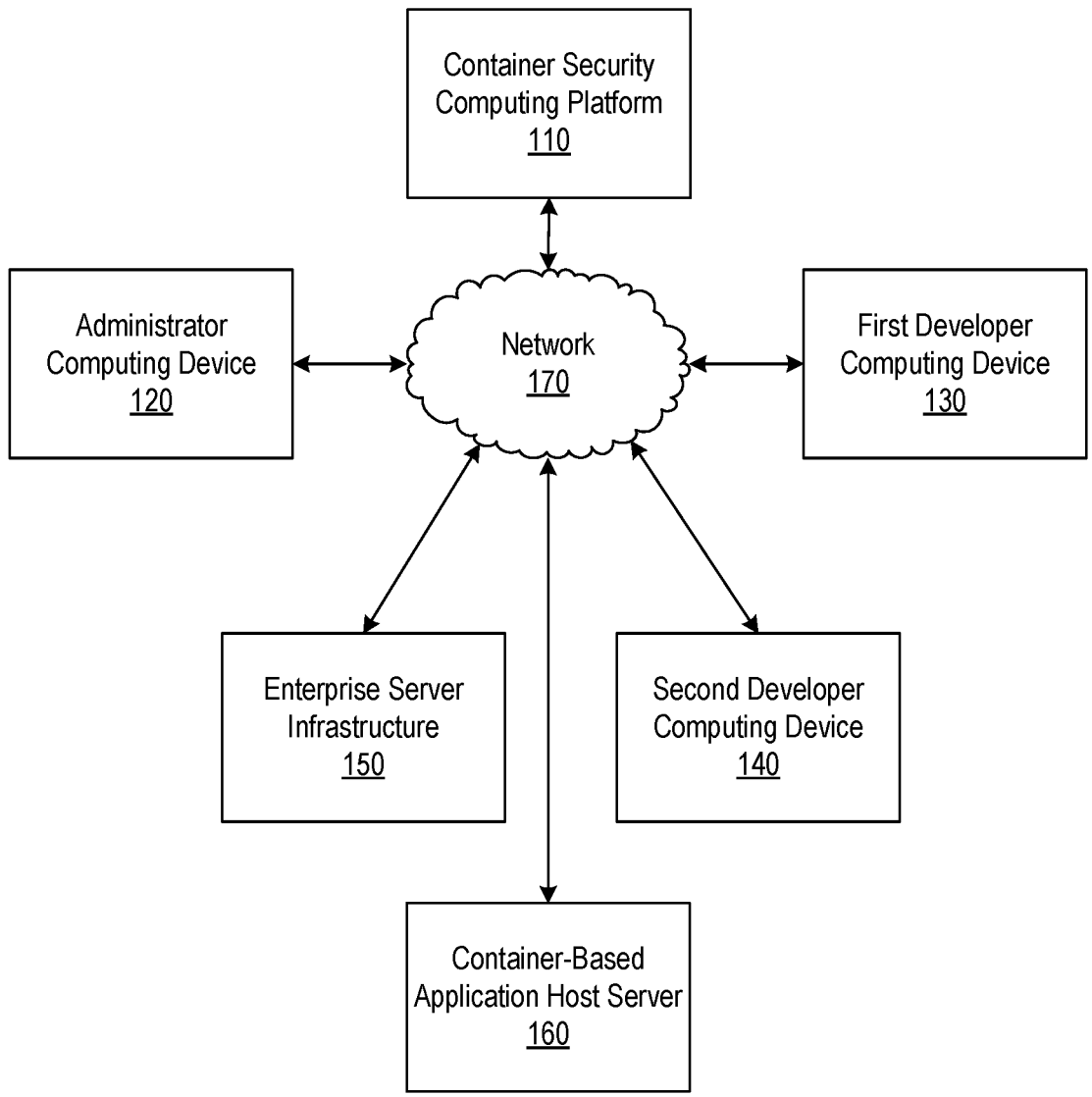
FIGS. 1A-1B depict an illustrative computing environment for monitoring container interactions and deploying security rules on a container-based computing infrastructure in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for monitoring container interactions and deploying security rules on a container-based computing infrastructure. While container-based infrastructure offers numerous benefits, it may also allow for unrestricted communications among various containers, which may lead to the potential risk of malicious actors intruding on containers, posing as a cybersecurity threat to the enterprise organization employing the container-based infrastructure.

In order to solve for the above-noted shortcomings, a computing platform may be configured to monitor and control communications among containers. Specifically, systems, methods, and apparatuses described herein may provide intelligent apparatuses that monitor and regulate communications among containers, thereby reducing or even eliminating potential risks of malicious actors intruding upon the containers. An intelligent apparatus may employ smart contracts that host predefined dynamic information security rules for sharing information between containers. Anomalies in data flow may be identified between containers by analyzing container image metadata. Knowledge graphs may be generated to provide an understanding of contextual information flow between containers. An identified anomaly in data flow may be parsed to a security policy rule generator module to generate dynamic security policy rules on run time so as to minimize security risks.

Deploying security rules as described herein may also trigger a non-fungible token (NFT) based mechanism that enables containers to certify ownership of data flow rules defined between containers. NFTs may be controlled by smart contracts, which in turn take feed from security policy rule generators employed by an intelligent apparatus. The intelligent apparatus may host cluster and chain of NFT certificates for validating and ensuring secure communication protocols between containers.

In some examples, semantic information relating to the communications among the containers and related security policy rules may be captured to generate knowledge graphs.

Natural language processing (NLP) may be employed to generate information security rules based on the knowledge graphs. The intelligent apparatus may be configured to automatically configure security rules and to generate and deploy a system of NFTs and smart contracts based on information flow among containers and security rules. In some instances, quantum machine learning algorithms may be leveraged to derive contextual data flow from the knowledge graphs, which may generate and update security policy rules more efficiently and effectively, thereby reducing potential exposure time for attacks from malicious actors.

In some examples, an intelligent apparatus may include one or more of the following in order to operate as described herein: a container data extractor, a quantum knowledge graph generator, a container data flow anomaly detection module, an NFT and smart contract generator, a dynamic security policy rule orchestration module, and the like. The intelligent apparatus may thus be configured to monitor and regulate communication among containers, leveraging NFT certificates, smart contracts, and quantum knowledge graphs, thereby reducing or even eliminating the potential risk of malicious actors intruding on container communications. The intelligent apparatus may identify security anomalies in data flow between containers by analyzing container data (e.g., container image metadata) and may generate knowledge graphs for analysis of contextual information flow between containers. Data flow security anomalies may be parsed to a security policy rule generator module to generate dynamic security rules on runtime so as to minimize security risks. The intelligent apparatus may use an NFT certificate-based mechanism that enables containers to certify ownership of data flow rules defined between containers at runtime. Each NFT may be controlled by a smart contract which may take feed from a security policy rule generator of the intelligent apparatus. The intelligent apparatus may monitor a system host cluster and chain of NFT certification for validating and ensuring secure communication protocols between containers. Additionally, semantic information captured by generated quantum knowledge graphs may be leveraged for generating security rules using NLP. The intelligent apparatus may thus automatically configure and deploy security rules across containers on runtime by leveraging quantum machine learning algorithms for knowledge graphs to derive contextual data flow inferences between containers and thereby reduce exposure time for potential attacks from malicious actors.

In some examples, a container-based architecture may include a plurality of applications, each application including a plurality of containers. Each of the containers of an applications may communicate with one or more other containers of the applications. Additionally, one or more of the applications may communicate with one or more other application. As an example of potential container activity, a web server container may expose a port such that it can receive requests on that port, or an application container may make a connection to a database container. As an example of potential application activity, a data processing application may write a file to a shared volume containing customer data, which is then read by another application, or two containers may share the same files. By monitoring this information flow, the intelligent apparatus may be configured to dynamically generate security policy rules based on understanding interactions between containers and applications. Such information may be captured by a quantum knowledge graph in order to analyze container clustering in the system. For example, information flow may be analyzed in real time by using artificial intelligence/machine learning to detect information flow, cluster groups, and identify variations in information flow to define actual containers and to identify any anomalies and subsequently issue alerts. By monitoring communications between containers over time and clustering data flow among the containers, and by analyzing contextual alerts using natural language processing (NLP), natural language understanding (NLU), and/or natural language generation (NLG), security monitoring and policy rule generation and updates may occur in real time. The intelligent apparatus may additionally perform real time alerts, e.g., using an alert console with a contextual alert message interface, and may dynamically synchronize security rules.

The intelligent apparatus may include a system architecture including one or more of the following: a deep learning module, an NFT generator, a smart contract generator, a security policy rule generator, and/or a dynamic security policy rule orchestration module. The deep learning module may include a container metadata extractor module, a knowledge graph generator, a quantum engine, and/or a data flow anomaly detection module. The intelligent apparatus may be employed in a container-based computing system in which a plurality of containers transmits communications with one or more other containers. Container metadata, made up of labels and tags may be exposed by infrastructure, containers, applications, and the like. Quantum machine learning and knowledge graphs may interlink descriptions of containers, relationships, and events by receiving a feed of container metadata, and subsequently data may be contextualized to dynamically regulate security policy rules.

Figure 1B:
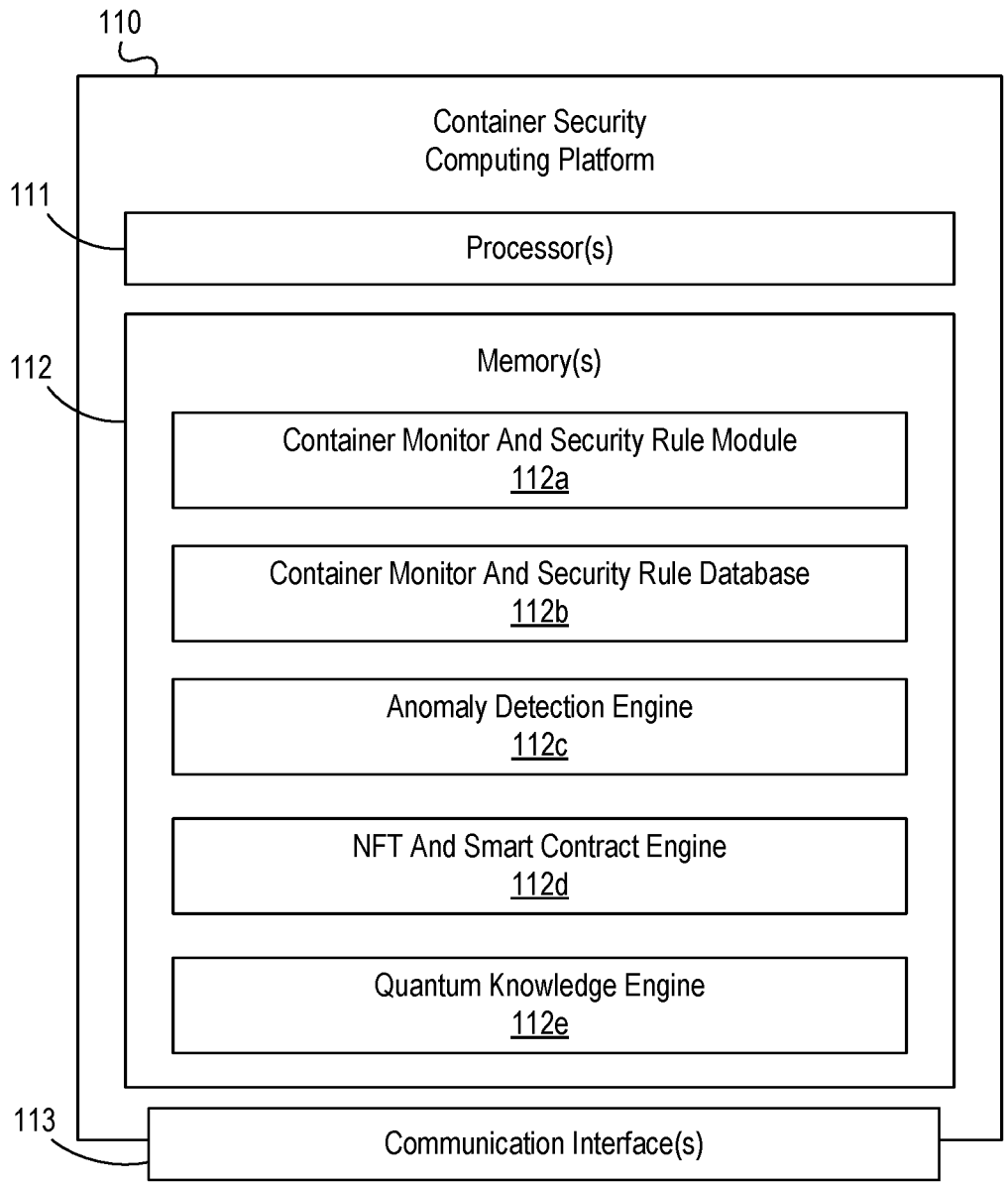

FIGS. 1A-1B depict an illustrative computing environment that monitors container interactions and deploys security rules on a container-based computing infrastructure in accordance with one or more example embodiments. Referring to FIG. 1A, computing environment 100 may include one or more computer systems. For example, computing environment 100 may include a container security computing platform 110, an administrator computing device 120, a first developer computing device 130, a second developer computing device 140, enterprise server infrastructure, and a container-based application host server 160.

As described further below, container security computing platform 110 may include a computer system that includes one or more computing devices (e.g., servers, server blades, or the like) and/or other computer components (e.g., processors, memories, communication interfaces) that may be used to monitor and analyze container interactions in a container-based computing infrastructure and mitigate security threats and potential vulnerabilities to various systems across an enterprise organization. In some instances, the container security computing platform 110 may maintain a database of security policy rules, analyzed container interactions, and related security threats or vulnerabilities associated with those interactions, and the container security computing platform 110 may use such a database to determine one or more corrective actions responsive to those security threats or vulnerabilities.

Container security computing platform 110 may include one or more computing devices configured to perform one or more of the functions described herein. For example, container security computing platform 110 may include one or more computers (e.g., laptop computers, desktop computers, servers, server blades, or the like) configured to perform one or more of the functions described herein, as discussed in greater detail below. Container security computing platform 110 may be configured to host and/or execute a quantum knowledge engine to provide more efficient container interaction monitoring that is capable on acting on potential security threats on runtime. In some examples, container security computing platform 110 may be connected to one or more enterprise computing platforms or devices to receive security policy information and/or enterprise security information.

Container security computing platform 110 may include distinct and physically separate data centers or other groupings of server computers that are operated by and/or otherwise associated with an organization, such as a financial institution. In addition, container security computing platform 110 may house a plurality of server computers and various other computers, network components, and devices. For example, container security computing platform 110 may include a plurality of server nodes that are made up of and/or otherwise include one or more servers and/or server blades, which may be monitored and/or controlled by container security computing platform 110 and/or one or more other computing devices included in computing environment 100. Each server and/or server blade included in the plurality of server nodes associated with container security computing platform 110 may include one or more processors, memories, communication interfaces, storage devices, and/or other components.

Administrator computing device 120 may include one or more computing devices and/or other computer components (e.g., processors, memories, communication interfaces). In addition, and as illustrated in greater detail below, administrator computing device 120 may be configured to receive information from, send information to, and/or otherwise exchange information with one or more devices that are physically present at and/or within a certain range of the enterprise location at which enterprise server infrastructure 150 may be deployed. In some examples, however, the administrator computing device 120 may be remote from and/or different from the enterprise location (e.g., where enterprise server infrastructure 150 is deployed).

Administrator computing device 120 may be a desktop computing device (e.g., desktop computer, terminal), or the like or a mobile computing device (e.g., smartphone, tablet, smart watch, laptop computer, or the like). In addition, the administrator computing device 120 may be linked to and/or used by one or more enterprise users (who may, e.g., be employees of an enterprise organization operating the enterprise center where administrator computing device 120 is deployed and/or used). For instance, the administrator computing device 120 may be deployed at an enterprise center, such as the enterprise center where enterprise server infrastructure 150 is deployed, so that administrator computing device 120 may be used by one or more employees of an enterprise organization operating the enterprise center when such employees are facilitating enterprise software development efforts. For example, the administrator computing device 120 may store and/or execute one or more enterprise applications, such as user account management applications, user history applications, account security applications, and/or other software applications, which may be used by the one or more enterprise users of the administrator computing device 120.

In one or more arrangements, the administrator computing device 120, and other computing devices included in computing environment 100 may be any type of computing device capable of receiving a user interface, receiving input via the user interface, and communicating the received input to one or more other computing devices. For example, the administrator computing device 120 may, in some instances, be and/or include server computers, desktop computers, laptop computers, tablet computers, smart phones, or the like and may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions. Container security computing platform 110 and/or administrator computing device 120 may be configured to provide one or more interfaces that allow for configuration and management of one or more other computing devices and/or computer systems included in computing environment 100, such as one or more interfaces that allow for management of programs accessed by a user computing device, such as the first developer computing device 130 or the second developer computing device 140.

First developer computing device 130 may include a laptop computer, desktop computer, mobile device, tablet, smartphone, or the like that may be used by an individual such as a developer of an enterprise organization (e.g., a financial institution, or the like) and/or a regulatory agency. For example, the first developer computing device 130 may be used by one or more individuals to request, access, or otherwise use various software programs. In some instances, first developer computing device 130 may be configured to display one or more user interfaces (e.g., providing notification of a determined security threat or vulnerability in a particular container interaction, notification that access is blocked to a particular container, and/or other interfaces).

Second developer computing device 140 may include a laptop computer, desktop computer, mobile device, tablet, smartphone, or the like that may be used by an individual such as a developer of an enterprise organization (e.g., a financial institution, or the like) and/or a regulatory agency. For example, the second developer computing device 140 may be used by one or more individuals to request, access, or otherwise use various software programs. In some instances, second developer computing device 140 may be configured to display one or more user interfaces (e.g., providing notification of a determined security threat or vulnerability in a particular container interaction, notification that access is blocked to a particular container, and/or other interfaces).

Enterprise server infrastructure 150 may include one or more computing devices and/or other computer components (e.g., processors, memories, communication interfaces). In addition, enterprise server infrastructure 150 may be configured to host, execute, and/or otherwise provide one or more enterprise applications. For example, enterprise server infrastructure 150 may be configured to host, execute, and/or otherwise provide an enterprise mobile application for user devices, and/or other programs associated with an enterprise server. In some instances, enterprise server infrastructure 150 may be configured to provide various enterprise and/or back-office computing functions for an enterprise organization, such as a financial institution. For example, enterprise server infrastructure 150 may include various servers and/or databases that store and/or otherwise maintain account information, such as financial account information including account balances, transaction history, account owner information, and/or other information. In addition, enterprise server infrastructure 150 may process and/or otherwise execute tasks on specific accounts based on commands and/or other information received from other computer systems included in computing environment 100. Additionally, or alternatively, enterprise server infrastructure 150 may receive instructions from the container security computing platform 110 and execute the instructions in a timely manner, e.g., for the monitoring container interactions and generating and deploying security policies for container interactions.

Enterprise server infrastructure 150 may include one or more computing devices and/or other computer components (e.g., processors, memories, communication interfaces), and may be configured to perform one or more functions related to event processing (e.g., processing of a trade, or other events). For example, the enterprise server infrastructure 150 may include an order management system, an execution system, an allocation system, a usage system, a clearing system, a confirmation system, a payment system, a request for quote system, a settlement system, a position keeping system, and/or other systems involved in event processing.

Enterprise server infrastructure 150 may include multiple server computers that are owned, operated, maintained, and/or otherwise used by an organization, such as an enterprise organization associated with the container security computing platform 110. For example, enterprise server infrastructure 150 may include one or more server computers that store and/or otherwise maintain enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

For example, enterprise server infrastructure 150 may include one or more computer systems that are configured to provide one or more portal interfaces to one or more client devices and/or configured to authenticate one or more client devices and/or users of such devices to such portal interfaces. For example, enterprise server infrastructure 150 may include a computer system configured to provide a customer portal, such as an online banking portal, to one or more customers of an organization, such as a financial institution, who may use one or more computing devices to access the portal and/or who may be authenticated to one or more portal user accounts by the computer system using various authentication techniques. In some instances, in addition to being configured to provide an online banking portal associated with a financial institution to one or more customers of the financial institution and/or their associated computing devices, the computer system (which may, e.g., be included in enterprise server infrastructure 150) also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Additionally or alternatively, enterprise server infrastructure 150 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating one or more computer systems in computing environment 100), to connect one or more customers of the organization with one or more customer service representatives of the organization via one or more telephone support sessions, chat support sessions, and/or other client support sessions.

Container-based application host server 160 may include one or more computing devices and/or other computer components (e.g., processors, memories, communication interfaces). In addition, container-based application host server may be configured to host, execute, and/or otherwise provide one or more enterprise applications. For example, container-based application host server 160 may be configured to host, execute, and/or otherwise provide a container-based cloud infrastructure that supports enterprise applications for user devices, and/or other programs associated with an enterprise server. In some instances, container-based application host server 160 may process and/or otherwise execute tasks based on commands and/or other information received from other computer systems included in computing environment 100. Additionally, or alternatively, container-based application host server 160 may receive instructions from the container security computing platform 110 and execute the instructions in a timely manner, e.g., for the tracking of potential cybersecurity threats or vulnerabilities.

Container-based application host server 160 may include multiple server computers that are owned, operated, maintained, and/or otherwise used by an organization, such as an enterprise organization associated with the container security computing platform 110. For example, container-based application host server 160 may include one or more server computers that store and/or otherwise provide a container-based cloud infrastructure that maintains enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

Computing environment 100 also may include one or more networks, which may interconnect container security computing platform 110, administrator computing device 120, first developer computing device 130, second developer computing device 140, enterprise server infrastructure 150, and/or container-based application host server 160. For example, computing environment 100 may include a network 170 (which may interconnect, e.g., container security computing platform 110, administrator computing device 120, first developer computing device 130, second developer computing device 140, enterprise server infrastructure 150, and/or container-based application host server 160).

In one or more arrangements, container security computing platform 110, administrator computing device 120, first developer computing device 130, second developer computing device 140, enterprise server infrastructure 150, and/or container-based application host server 160 may include any type of computing device capable of sending and/or receiving requests and processing the requests accordingly. For example, container security computing platform 110, administrator computing device 120, first developer computing device 130, second developer computing device 140, enterprise server infrastructure 150, and/or container-based application host server 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all container security computing platform 110, administrator computing device 120, first developer computing device 130, second developer computing device 140, enterprise server infrastructure 150, and/or container-based application host server 160, may, in some instances, include special-purpose computing devices configured to perform specific functions.

In some arrangements, container security computing platform 110, administrator computing device 120, first developer computing device 130, second developer computing device 140, enterprise server infrastructure 150, and/or container-based application host server 160 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because container security computing platform 110 is able to monitor various container interactions, e.g., for the purpose of mitigating security threats and vulnerabilities to data and computing systems. Quantum knowledge graphs, machine learning, and NFT and smart contract generators (e.g., by container security computing platform 110) may be used to efficiently monitor container interactions and mitigate instances where potential security threats or vulnerabilities have been identified.

Network 170 may include one or more sub-networks (e.g., Local Area Networks (LANs), Wide Area Networks (WANs), or the like). In some examples, network 170 may be associated with a particular organization (e.g., a corporation, financial institution, educational institution, governmental institution, or the like) and may interconnect one or more computing devices associated with the organization. For example, container security computing platform 110, administrator computing device 120, first developer computing device 130, second developer computing device 140, enterprise server infrastructure 150, and/or container-based application host server 160, may be associated with an organization (e.g., a financial institution), and network 170 may be associated with and/or operated by the organization, and may include one or more networks (e.g., LANs, WANs, virtual private networks (VPNs), or the like) that interconnect container security computing platform 110, administrator computing device 120, first developer computing device 130, second developer computing device 140, enterprise server infrastructure 150, and/or container-based application host server 160, and one or more other computing devices and/or computer systems that are used by, operated by, and/or otherwise associated with the organization.

Referring to FIG. 1B, container security computing platform 110 may include one or more processors 111, memory 112, and communication interface 113. A data bus may interconnect processor 111, memory 112, and communication interface 113. Communication interface 113 may be a network interface configured to support communication between container security computing platform 110 and one or more networks (e.g., network 170, or the like). Memory 112 may include one or more program modules having instructions that when executed by processor 111 cause container security computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of container security computing platform 110 and/or by different computing devices that may form and/or otherwise make up container security computing platform 110. For example, memory 112 may have, host, store, and/or include container monitor module 112a, a container monitor and security rule database 112b, an anomaly detection engine 112c, an NFT and smart contract engine 112d, and a quantum knowledge engine 112e.

Container monitor module 112a may have instructions that direct and/or cause container security computing platform 110 to, for instance, provide rules or similar policy information from a repository to carry out container interaction monitoring and/or instructions that direct container security computing platform 110 to perform other functions to detect or identify potential security threats or vulnerabilities in container interactions, as discussed in greater detail below. Container monitor module 112a may have instructions that direct and/or cause container security computing platform 110 to execute advanced techniques to provide one or more tracking functions, such as tracking type of commands used or data requested for use by container in container-based application host server 160, analyzing those interactions, identifying security threats or vulnerabilities in those interactions, and determining corrective actions to address identified threats or vulnerabilities.

The container monitor module 112a may also obtain information from a security data correlation engine, which in turn gathers data from various tools available for assessing or analyzing container in a container-based infrastructure, such as virus tools, threat intelligence, proxy exceptions, and the like. The container monitor module 112a may also obtain information from administrator computing device 120, e.g., to update or more security rules, protocols, lists of potential threat indicators, and the like. The container monitor module 112a may also obtain information from the container monitor and security rule database 112b, e.g., relating to result of key threats associated with one or more types of container interactions. In some examples, the container monitor module 112a may obtain container metadata using a container data extractor, may generate security policy rules using a security policy rule generator module, and may deploy security rules using a dynamic security policy rule orchestration module. As described in more detail below, security anomalies identified from data flow between containers may be parsed to the container monitor module 112a for generating dynamic security rules on runtime so as to minimize security risks.

The container monitor and security rule database 112b may store information used by container monitor module 112a and/or container security computing platform 110 in application of advanced techniques to monitor container interactions, store security policy rules, and mitigate security threats or vulnerabilities in various containers and related container interactions, and/or in performing other functions. The container monitor and security rule database 112b may store information received from administrator computing device 120 (e.g., relating to enterprise-specific security policies, settings, or preferences) and information from previous analysis of container interactions, as discussed in greater detail below.

Anomaly detection engine 112c may have instructions that direct and/or cause the container security computing platform 110 to identify anomalies in container interactions, process identified anomalies to determine security threats or vulnerabilities (e.g., as determined by container monitor module 112a) and to determine a risk associated with such security threats or vulnerabilities, e.g., for the purposes of identifying one or more corrective actions associated with a container interaction. Based on analyzing various information, the anomaly detection engine 112c may identify and transmit indications of key threats to other computing devices, such as the administrator computing device 120, the first developer computing device 130, and/or the second developer computing device 140. Based on identification of key threats, the anomaly detection engine 112c may compile and provide one or more reports, such as a result report, a threat report, and the like. In some examples, the anomaly detection engine 112c may also receive container interaction analysis and tracking information from the container monitor and security rule database 112b. In some examples, the anomaly detection engine 112c may include a container data flow anomaly detection module which may identify security anomalies in data flow between containers by analyzing container data (e.g., container image metadata).

NFT and smart contract engine 112d may have instructions that direct and/or cause the container security computing platform 110 to generate, maintain, modify and/or deploy NFTs and smart contracts relating to container interactions in the container-based application host server 160 and/or other parameters used by the container security computing platform 110 and/or other systems in computing environment 100. NFT and smart contract engine 112d may employ a dynamic security policy rule orchestration module that uses an NFT certificate-based mechanism that enables containers to certify ownership of data flow rules defined between containers at runtime. Each NFT may be controlled by a smart contract generated by the NFT and smart contract engine 112d, such that container monitor module 112a may in turn monitor a cluster and chain of NFT certification as part of validating and ensuring secure communication protocols between containers.

Quantum knowledge engine 112e may have instructions that direct and/or cause the container security computing platform 110 to set, define, and/or iteratively refine optimization rules and/or other parameters used by the container security computing platform 110 and/or other systems in computing environment 100. Quantum knowledge engine 112e may have instructions that direct and/or cause the container security computing platform 110 to dynamically generate quantum knowledge graphs based on monitored container interactions. Quantum knowledge engine 112e may generate knowledge graphs for analysis of contextual information flow between containers for identifying security anomalies in data flow between containers. Additionally, quantum knowledge engine 112e may capture semantic information from quantum knowledge graphs for generating security rules, e.g., using NLP. The container security computing platform 110 may thus automatically configure and deploy security rules across containers on runtime using quantum knowledge engine 112e which employs quantum machine learning algorithms for knowledge graphs to derive contextual data flow inferences between containers. The quantum knowledge engine 112e may employ a deep learning module capable of interlinking descriptions of containers, relationships, and events by receiving a feed of container metadata, and subsequently contextualizing data to dynamically regulate security policy rules.

Figure 2A:
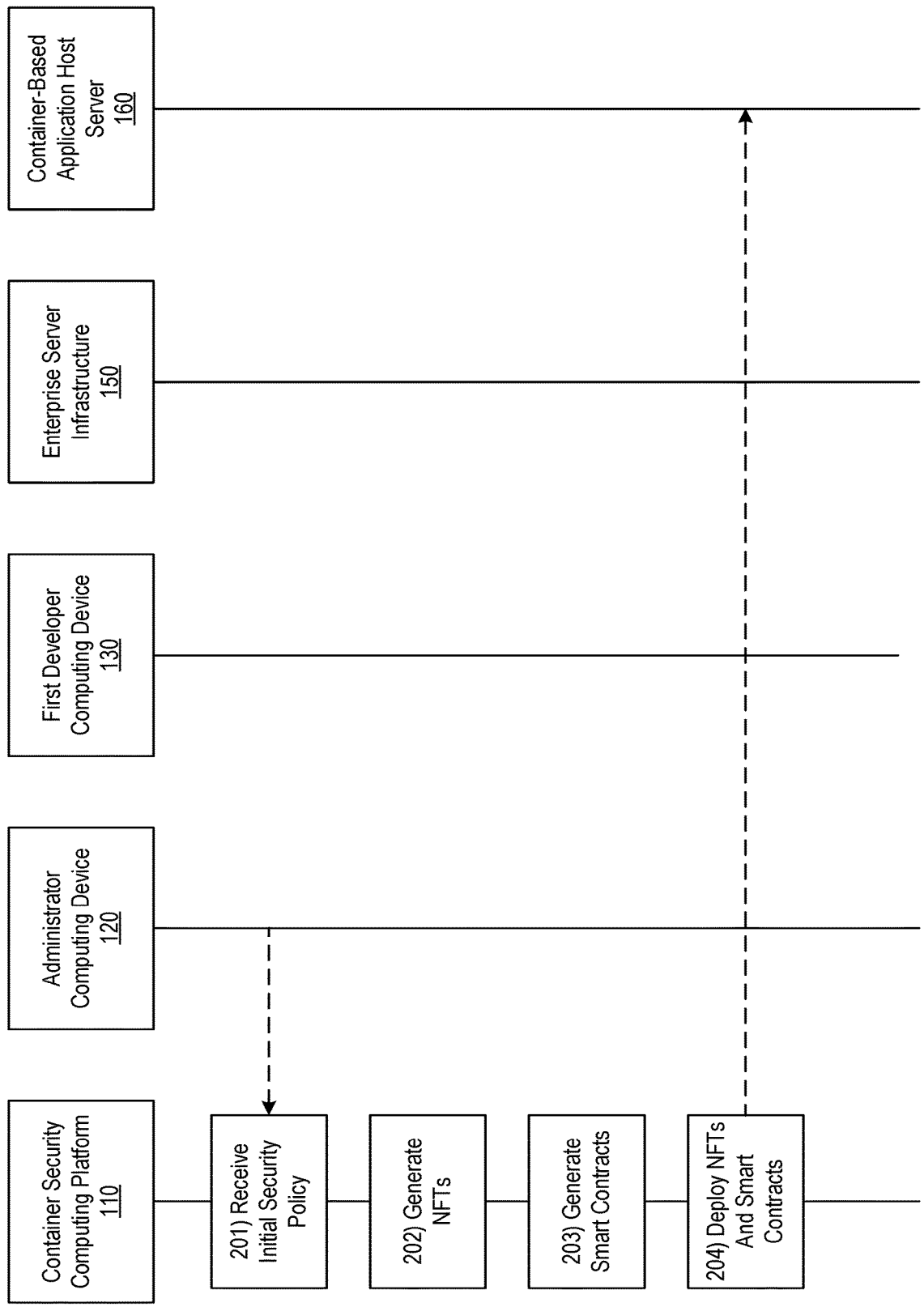

FIGS. 2A-2G depict an illustrative event sequence for monitoring container interactions and deploying security rules on a container-based computing infrastructure in accordance with one or more example embodiments. Aspects of the illustrative event sequence described herein provide effective, efficient, scalable, and convenient technical solutions that address and overcome the technical problems associated with monitoring container interactions and mitigating security threats and vulnerabilities in a container-based computing infrastructure. Referring to FIG. 2A, at step 201, the container security computing platform 110 may receive initial security policies from the administrator computing device 120. The container security computing platform 110 may receive such security policies as an initial step in monitoring container interactions and deploying security rules on a container-based computing infrastructure, and may continue to receive updated security policies throughout operations. The security policies received at step 201 may be specific to security preferences or protocols for a particular enterprise organization and may function to adjust alert action procedures and/or security alerts initiated by the container security computing platform 110. In some instances, the security policies received at step 201 may be specific to certain developer computing devices across an enterprise organization, specific to certain applications used by an enterprise organization, based on rules or other settings set by an enterprise organization (e.g., received from the administrator computing device 120), and the like. In some instances, the initial security policy received at step 201 may be responsive to a user request to monitor container interactions, e.g., if a user is notified of potential vulnerabilities and selects for the containers to be monitored, as will be discussed in more detail below. In some instances, the container security computing platform 110 may receive the initial security policy during the course of monitoring container interactions.

At step 202, the container security computing platform 110 may generate one or more NFTs (e.g., using the NFT and smart contract engine 112d) that may be used to certify authorized containers in a container-based computing infrastructure, such as the container-based application host server 160. For example, the NFTs may be generated as part of initializing security policies. In that regard, the NFTs may be automatically generated at step 202, based receiving initial security policy rules, and without user input to the container security computing platform 110. The container security computing platform 110 may review records, additional enterprise security policies, and/or other information stored in the container monitor and security rule database 112b as part of generating one or more NFTs. In some examples, the container security computing platform 110 may access and review records stored in the container monitor and security rule database 112b as part of generating one or more NFTs. The records stored in the container monitor and security rule database 112b may include one or more additional identifiers, descriptors, and/or other information related to analysis of container applications, such as container image metadata, the specific application in which one or more containers interacts, previously identified security threats or vulnerabilities, corrective actions determined in response to previously identified security threats or vulnerabilities, timestamps of previous analyses, and the like At step 203, the container security computing platform 110 may generate one or more smart contracts (e.g., using the NFT and smart contract engine 112d) for controlling communications between containers. For example, the smart contracts may be generated as part of initializing security policies. In that regard, the smart contracts may be automatically generated at step 203, based receiving initial security policy rules, and without user input to the container security computing platform 110. The container security computing platform 110 may review records, additional enterprise security policies, and/or other information stored in the container monitor and security rule database 112b as part of generating one or more smart contracts. In some examples, the container security computing platform 110 may access and review records stored in the container monitor and security rule database 112b as part of generating one or more smart contracts. At step 204, the container security computing platform 110 may deploy the NFTs and smart contracts to the container-based application host server 160.

Figure 2B:
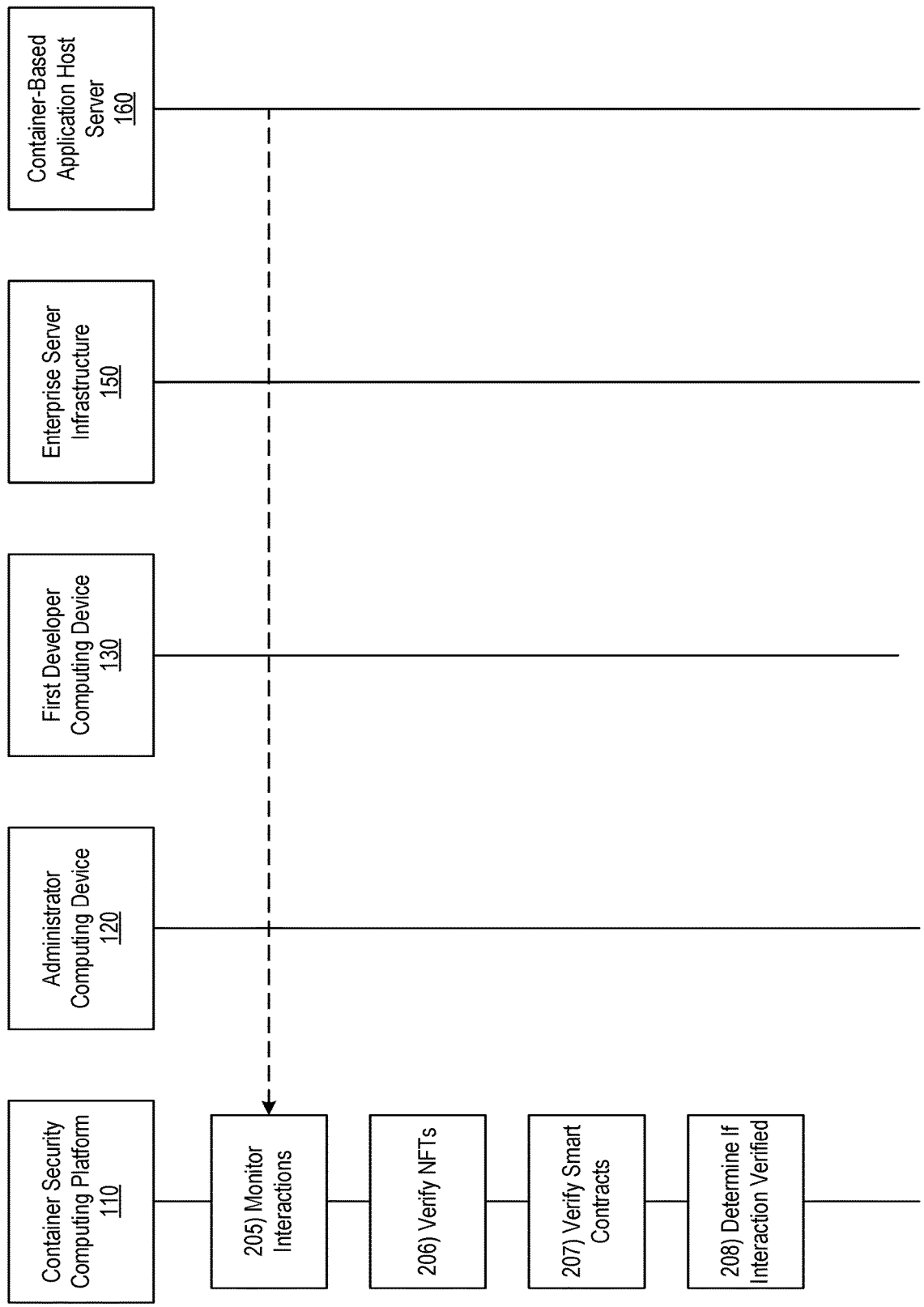

Now referring to FIG. 2B, at step 205, the container security computing platform 110 may monitor interactions between containers and/or container-based applications in the container-based application host server 160. For example, the container security computing platform 110 may access container image metadata of containers involved in monitored container interactions, and a type of interaction involved in each container interaction. In some instances, the container security computing platform 110 may monitor any activity that occurs with or between in containers in the container-based application host server 160. In some instances, the container security computing platform 110 may monitor only predefined activity types in the container-based application host server 160, such as interactions occurring as part of particular applications or specific types of interactions, among other examples.

At step 206, the container security computing platform 110 may verify one or more NFTs associated with interacting containers. Verification of the NFTs may include first identifying whether a container is associated with any NFT and, once an NFT has been identified for a particular container, verifying that NFT. In some instances, verifying one or more NFTs may include identifying a first non-fungible token (NFT) associated with a first container and a second NFT associated with a second container, authenticating the first container based on the first NFT, which is configured to certify ownership of the first container, and authenticating the second container based on the second NFT, which is configured to certify ownership of the second container. The first NFT and the second NFT may be controlled by least one smart contract that includes a set of dynamic security rules for interactions between containers. In some examples, the container security computing platform 110 may verify an NFT based on analysis of one or more identifiers, descriptors, and/or other information related to a security analysis of the container and/or the associated NFT. In some examples, the container security computing platform 110 may proceed to access the NFT as part of the verification performed at step 206. In some instances, verifying the NFT at step 206 may include analyzing the NFT associated with the container relative to the initial security policy received at step 201 and/or with security policies associated with an enterprise organization.

At step 207, the container security computing platform 110 may verify an interaction between containers based on one or more smart contracts associated with the interaction between containers. Verification of the interaction may include first identifying containers involved in the interaction, then identifying a smart contract associated with interactions between those identified containers, and, once a smart contract has been identified, verifying that smart contract. In some examples, the container security computing platform 110 may verify an interaction between containers based on analysis of one or more identifiers, descriptors, and/or other information related to a security analysis of the interaction and/or the associated smart contract. In some examples, the container security computing platform 110 may proceed to access the smart contract as part of the verification performed at step 207. In some instances, verifying the interaction at step 207 may include analyzing the smart contract relative to the initial security policy received at step 201 and/or with security policies associated with an enterprise organization.

The container security computing platform 110 may proceed to step 208 verifying the NFTs of containers interacting and/or upon verifying smart contracts associated with the interactions between containers. In some instances, where one or more NFT could not be verified or where one or more smart contract could not be identified, the container security computing platform 110 may transmit a notification, e.g., to an administrator computing device 120, to a computing device associated with the enterprise server infrastructure, and the like, a receive authorization that activity is verified or that a change to security policies has been made as part of step 208.

In some instances, the container security computing platform 110 may proceed to step 208 without verifying NFTs and/or without verifying smart contracts based on types of interactions between containers and/or based on terms of the initial security policy received at step 201. At step 208, the container security computing platform 110 may analyze the interactions between containers relative to interactions that match a predefined list of interactions associated with potential vulnerabilities. The predefined list of interactions associated with potential vulnerabilities may be dynamically updated with the quantum knowledge engine 112e of the container security computing platform 110, based on vulnerability reports received from one or more developer computing devices and/or administrator computing devices associated with an enterprise organization, and the like. In some examples, the predefined list of interactions may be set by an administrator of an enterprise organization, such as a user associated with the administrator computing device 120. In such examples, the administrator computing device 120 may periodically provide updates to the predefined list of interactions, e.g., based on various updates to security policies, based on new learning of potential vulnerabilities, and the like. In some instances, step 208 may include assessing the interaction relative to an enterprise security protocol list. The enterprise security protocol list may be dynamically updated with the quantum knowledge engine 112e based on vulnerability reports received from at least one user computing device associated with an enterprise organization.

Figure 2C:
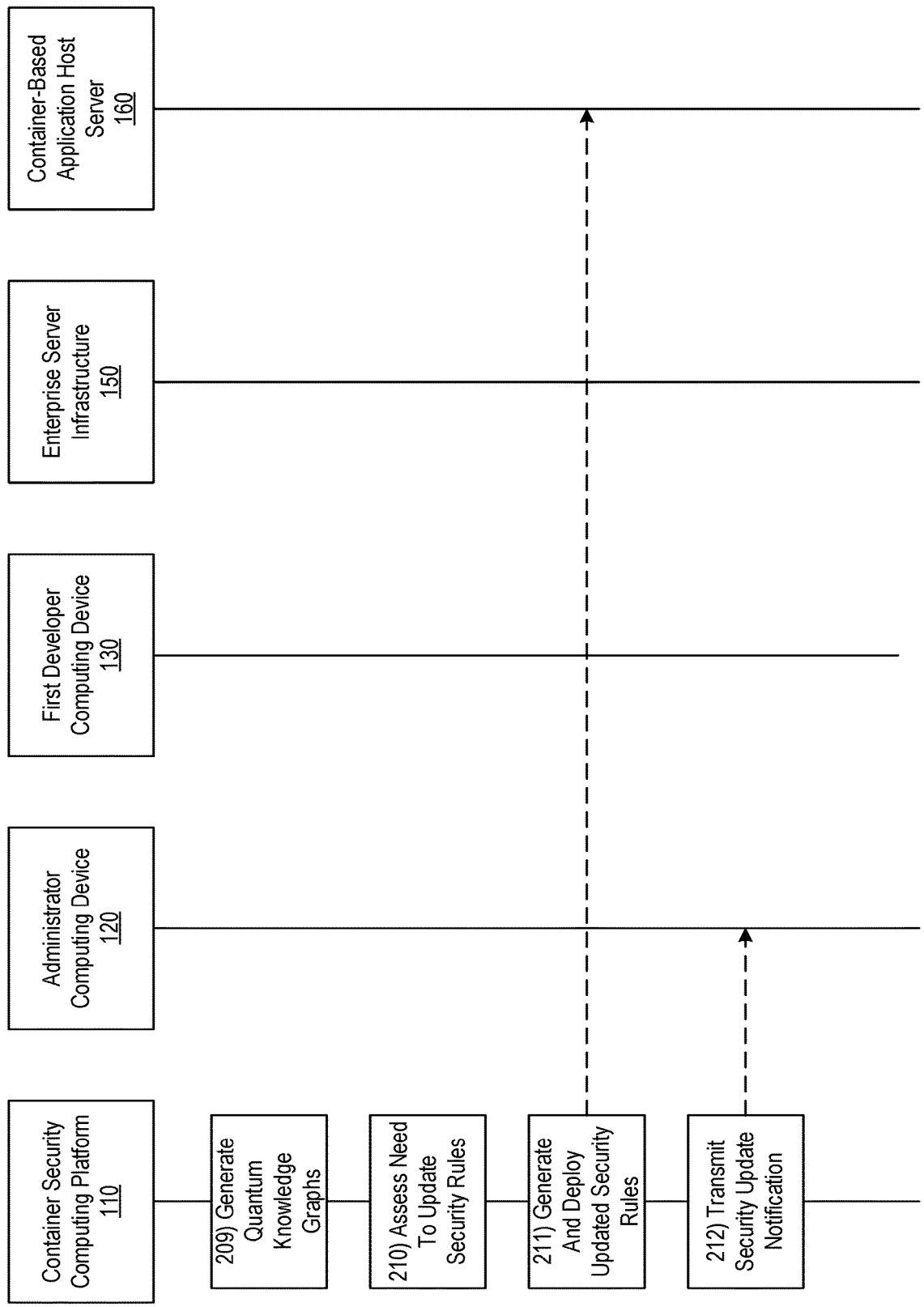

Referring to FIG. 2C, at step 209, the container security computing platform 110 may analyze monitored activity using quantum knowledge graphs, e.g., using the quantum knowledge engine 112e, for analysis of contextual information flow between containers. For example, a quantum knowledge graph may be trained based on interactions in the container-based application host server 160 and based on analyzing container image metadata. The quantum knowledge graph may be used for identifying anomalies in data flow between containers as the container security computing platform 110 continues to monitor interactions on the container-based application host server 160. Certain nonlimiting examples of quantum knowledge graphs are discussed in U.S. Pat. No. 11,244,231, the contents of which are incorporated herein. The quantum knowledge graphs generated at step 209 may provide an understanding of contextual information flow between containers. In some examples, semantic information relating to the interactions between containers and related security policy rules may be captured in the generated quantum knowledge graphs. Analyzing monitored activity at step 209 may include using natural language processing (NLP) to generate security rules based on the quantum knowledge graphs. In some instances, quantum machine learning algorithms may be leveraged to derive contextual data flow from the quantum knowledge graphs, which may subsequently be used to generate and update security policy rules efficiently on runtime, thereby reducing potential exposure time for attacks. Various aspects of contextual information derived from the quantum knowledge graph may be stored to the container monitor and security rule database 112b for further use, as will be described in more detail below.

At step 210, the container security computing platform 110 may determine if one or more security policy rules are to be updated based on verified activity in the container-based application host server 160. In some examples, the container security computing platform 110 may automatically identify one or more security rules to be updated based on the monitored interactions and based on, e.g., verified NFTs and/or smart contracts that fall outside the scope of the current security policy rules. In some examples, container security computing platform 110 may analyze the quantum knowledge graph generated at step 209 as part of determining if one or more security policy rules are to be updated. For example, the quantum knowledge graph may identify information flow indicative of a new application, and the container security computing platform 110 may, as part of step 210, determine one or more security policy rules associated with the new application and the related information flow. In some instances, the container security computing platform 110 may determine if one or more security policy rules are to be updated based on identifying a potential security risk of an anomaly in a container interaction, and determining that the potential security risk does not exceed a risk threshold. In some examples, determining if one or more security policy rules are to be updated at step 210 may include requesting and receiving authorization from an enterprise administrator or developer, e.g., a user associated with the administrator computing device 120, the first developer computing device 130, the second developer computing device 140, and the like.

At step 211, the container security computing platform 110 may generate and deploy, to the container-based application host server 160, security updates based on one or more determinations made at step 210. In some examples, the security updates may include one or more NFTs and/or one or more smart contracts, e.g., based on determining containers and/or interactions are authorized and/or based on determining a lack of NFTs and/or smart contracts associated with a particular interaction between containers. In some instances, security updates may be generated based on various container interaction data stored locally at the container security computing platform 110, e.g., in the container monitor and security rule database 112b and/or obtained from the quantum knowledge graph generated at step 209. In some examples, security updates generated and deployed at step 211 may include performing one or more updates to the initial security policy received at step 201. In those instances, a verification of the one or more updates to the initial security policy may be transmitted to the administrator computing device 120 as part of step 210.

Figure 3:
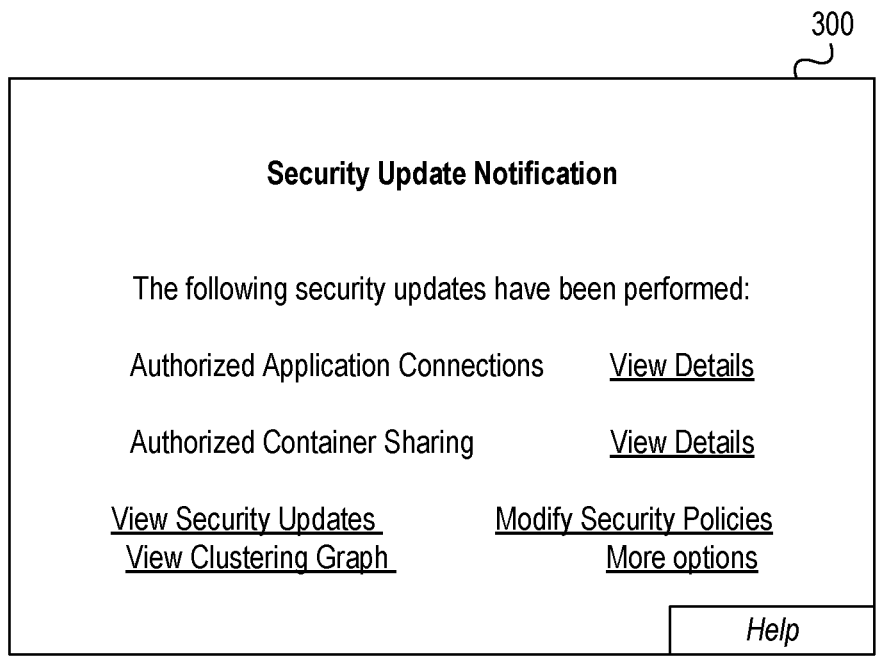
FIGS. 3-4 depict an illustrative graphical user interface for monitoring container interactions and deploying security rules on a container-based computing infrastructure in accordance with one or more example embodiments.

At step 212, a security update notification may be transmitted to the administrator computing device 120. In some instances, the security update notification may be transmitted in the form of a security update report that may include a summary of the security updates and identification of the one or more interactions in the container-based application host server 160 that relate to the security updates. In some instances, the security update notification may be transmitted in the form of an interface that may be displayed at the administrator computing device 120. In displaying the interface, the administrator computing device 120 may display a graphical user interface similar to graphical user interface 300, which is shown in FIG. 3. For example, the administrator computing device 120 may display an indication that security updates have been performed, one or more links to view additional details or information related to information analyzed and verified, clustering graphs views, e.g., generated from information obtained in the quantum knowledge graphs, information related to the security updates performed, selectable options to change security updates or security policies, and the like. Additionally or alternatively, the graphical user interface 300 may include links to access further information for the contextual information related to the security updates, links to view related container application descriptions, links to view options to reconfigure displayed information in graphical user interface 300, and the like. Upon selecting one or more of the links, the administrator computing device 120 may provide one or more additional interfaces related to the selected link. In some examples, a graphical user interface similar to graphical user interface 300 may be displayed at the container security computing platform 110, at the administrator computing device 120, and/or at another suitable computing device within the enterprise server infrastructure 150.

Figure 2D:
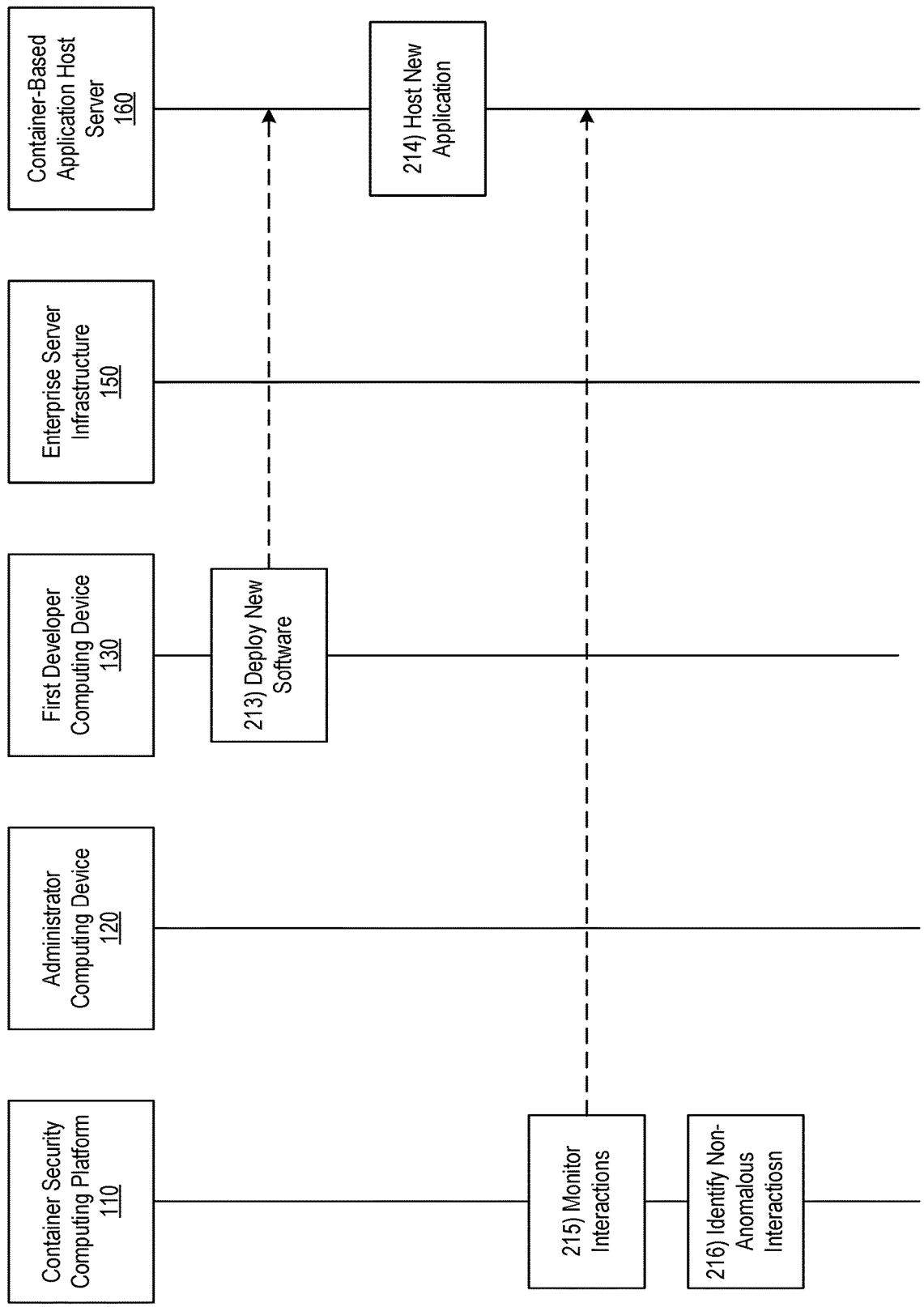

Referring to FIG. 2D, at step 213, the first developer computing device 130 may deploy new software or one or more software updates to the container-based application host server 160. For example, the new software or software update may relate to a particular application hosted by an enterprise organization. As another example, the new software or software update may relate to a new application not previously used by the enterprise organization. At step 214, the container-based application host server 160 may host a new application associated with the new software or software update. In some examples, the new application may be automatically deployed in the container-based environment, e.g., if a user associated with the first developer computing device 130 has certain privileges, if enterprise-wide security policies allow for automatic deployment, and the like.

Following the hosting of the new application, at step 215, the container security computing platform 110 may monitor ongoing interactions between containers on the container-based application host server 160. Monitoring ongoing interactions at step 215 may be similar to the monitoring at step 205. In some instances, at step 215, the container security computing platform 110 may access container image metadata of containers involved in monitored container interactions, and the container security computing platform 110 may identify a type of interaction involved in each container interaction. In some instances, the container security computing platform 110 may monitor any activity that occurs with or between in containers in the container-based application host server 160. In some instances, the container security computing platform 110 may monitor only predefined activity types in the container-based application host server 160, such as interactions occurring as part of the new application, among other examples.

Various aspects of the monitored interactions may be stored by the container security computing platform 110 for subsequent analysis and/or for retraining the quantum knowledge graph, as will be described in more detail below. For example, the container security computing platform 110 may obtain contextual information related to monitored interactions, using the quantum knowledge engine 112e, to identify potential anomalies in interactions relative to enterprise security policies.

At step 216, the container security computing platform 110 may identify non-anomalous interactions in the monitored interactions of containers. In some examples, identifying non-anomalous interactions may be based on analyzing interaction with the quantum knowledge graph to determine if the interaction is similar to other types of authorized interactions. In some examples, identifying non-anomalous interactions may be based on verifying one or more NFTs and/or verifying one or more smart contracts associated with the monitored interactions between container. Verifying one or more NFTs and verifying one or more smart contracts may be performed similar to verifying NFTs in step 206 and verifying smart contracts at step 207, respectively. In some examples, identifying non-anomalous interactions may be based on verifying the monitored interactions, and assessing the monitored interactions relative to enterprise security policy rules, such as the initial security policy received at step 201, the updated security rules generated at step 211, and the like. In some examples, the container security computing platform 110 may identify interactions as non-anomalous (or anomalous, as described in more detail below) on the fly, e.g., on runtime, as the container interactions are occurring. In some examples, the container security computing platform 110 may automatically store monitored interactions of containers that have been identified as non-anomalous to the container monitor and security rule database 112b. In some examples, the container security computing platform 110 may automatically retrain the quantum knowledge graph with monitored interactions of containers that have been identified as non-anomalous using the quantum knowledge engine 112e.

Referring to FIG. 2E, at step 217, the container security computing platform 110 may identify one or more interactions in the monitored interactions of containers as anomalous. In some examples, identifying an interaction as anomalous may be based on analyzing the interaction with the quantum knowledge graph to determine if the interaction is dissimilar to, or an outlier of, other types of authorized interactions. In some examples, identifying an interaction as anomalous may be based on failing to verify one or more NFTs and/or one or more smart contracts associated with the interaction. Verifying one or more NFTs and verifying one or more smart contracts may be performed similar to verifying NFTs in step 206 and verifying smart contracts at step 207, respectively. In some examples, identifying an interaction as anomalous may be based on analyzing container image metadata of a first container and a second container and determining that an interaction between the first container and the second container is an anomaly based on the container image metadata and one or more enterprise security rules. In some examples, identifying an interaction as anomalous may be based on verifying monitored interactions, and assessing the monitored interactions relative to enterprise security policy rules, such as the initial security policy received at step 201, the updated security rules generated at step 211, and the like. In some examples, the container security computing platform 110 may identify an interaction as anomalous on the fly, e.g., on runtime, as the container interactions are occurring.

At step 218, the container security computing platform 110 verify one or more smart contracts associated with the interaction identified as anomalous at step 217. Verifying the one or more smart contracts at step 218 may be similar to verifying the one or more smart contracts at step 207. Verification of the smart contract may include first identifying containers involved in the interaction, then identifying a smart contract associated with interactions between those identified containers, and, once a smart contract has been identified, verifying that smart contract. In some examples, the container security computing platform 110 may verify an interaction between containers based on analysis of one or more identifiers, descriptors, and/or other information related to a security analysis of the interaction and/or the associated smart contract. In some examples, the container security computing platform 110 may proceed to access the smart contract as part of the verification performed at step 218. In some instances, verifying the smart contract at step 218 may include analyzing the smart contract relative to the current security policy, e.g., received at step 201 or generated at step 211, and/or with security policies associated with an enterprise organization.

At step 219, the container security computing platform 110 verify one or more NFTs associated with one or more containers involved in the interaction identified as anomalous at step 217. Verifying the one or more NFTs at step 219 may be similar to verifying the one or more NFTs at step 206. Verification of the NFTs may include first identifying whether a container is associated with any NFT and, once an NFT has been identified for a particular container, verifying that NFT. In some examples, the container security computing platform 110 may verify an NFT based on analysis of one or more identifiers, descriptors, and/or other information related to a security analysis of the container and/or the associated NFT. In some examples, the container security computing platform 110 may proceed to access the NFT as part of the verification performed at step 219. In some instances, verifying the NFT at step 219 may include analyzing the NFT associated with the container relative to the initial security policy received at step 201 or the updated security policy generated at step 211 and/or with security policies associated with an enterprise organization.

At step 220, the container security computing platform 110 may identify a potential risk associated with the anomalous interaction. In some examples, the container security computing platform 110 may identify a potential risk at step 220 based on determining a level of potential security risk associated with an anomalous container interaction. In some instances, where the level of potential security risk does not exceed a risk threshold, the container security computing platform 110 may automatically generate and deploy one or more security rules to the container-based application host server 160 and may retrain the quantum knowledge graph based and, where the level of potential security risk exceeds a risk threshold, the container security computing platform 110 may transmit to the administrator computing device 120, an alert action configured to be displayed on an interface of the administrator computing device 120. In some examples, a potential risk may be identified upon failing to verify one or more smart contracts at step 218 or upon failing to identify one or more NFTs at step 219. verify one or more NFTs associated with one or more containers involved in the interaction identified as anomalous at step 217. In some instances, the container security computing platform 110 may proceed to step 220 without verifying NFTs and/or without verifying smart contracts based on types of interactions between containers and/or based on terms of the current enterprise security policy. At step 220, the container security computing platform 110 may analyze the interactions between containers relative to interactions that match a predefined list of interactions associated with potential vulnerabilities. The predefined list of interactions associated with potential vulnerabilities may be dynamically updated with the quantum knowledge engine 112e of the container security computing platform 110, based on vulnerability reports received from one or more developer computing devices and/or administrator computing devices associated with an enterprise organization, and the like. In some examples, the predefined list of interactions may be set by an administrator of an enterprise organization, such as a user associated with the administrator computing device 120. In such examples, the administrator computing device 120 may periodically provide updates to the predefined list of interactions, e.g., based on various updates to security policies, based on new learning of potential vulnerabilities, and the like. In some instances, step 220 may include assessing the interaction relative to an enterprise security protocol list. The enterprise security protocol list may be dynamically updated with the quantum knowledge engine 112e based on vulnerability reports received from at least one user computing device associated with an enterprise organization.

Figure 2F:
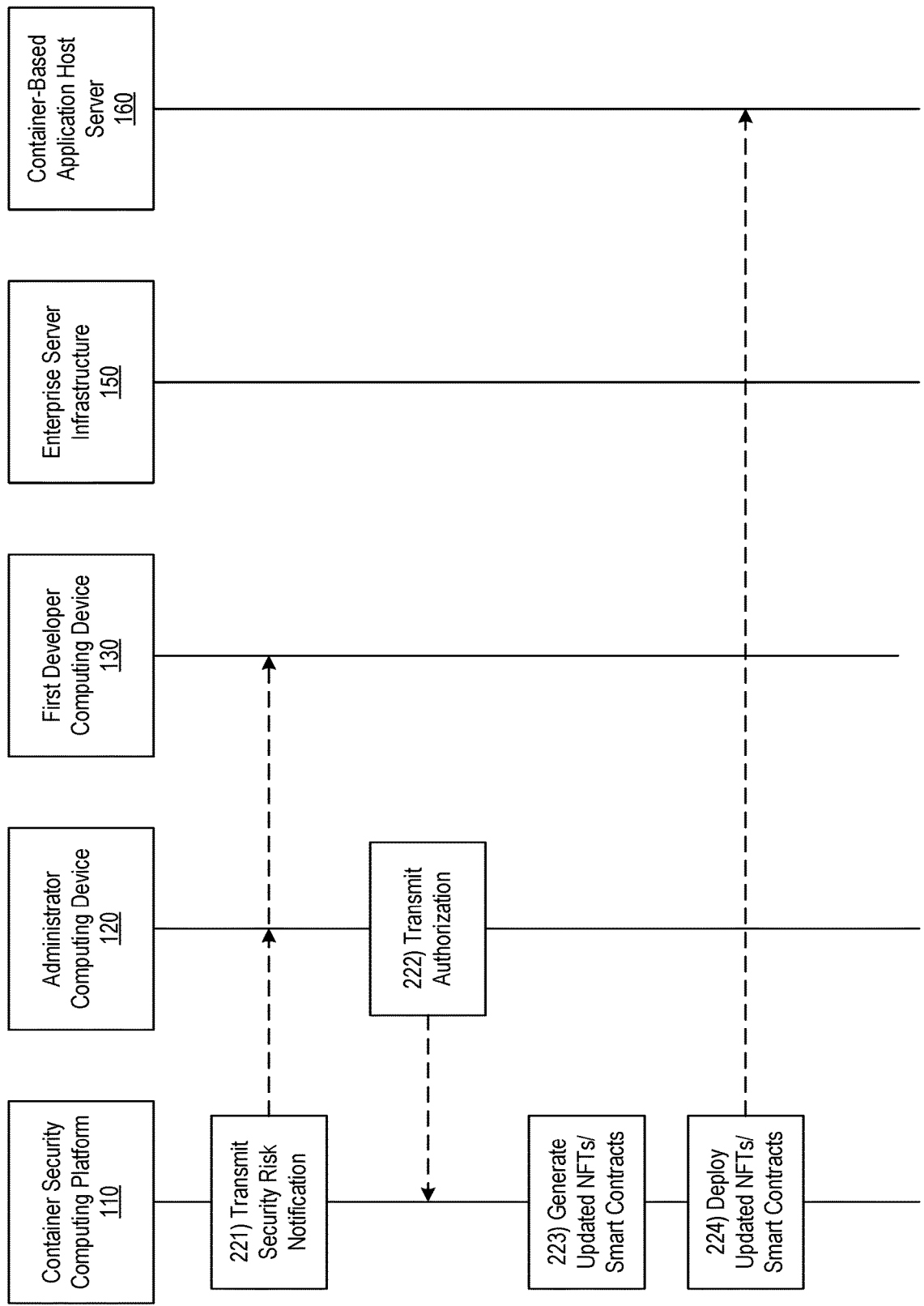

Now referring to FIG. 2F, at step 221, the container security computing platform 110 may transmit a security risk notification (e.g., including an alert action) to the administrator computing device 120, e.g., based on identifying the potential security risk at step 220. In some instances, the security risk notification may additionally or alternatively be transmitted to the first developer computing device 130 at step 221. The administrator computing device 120 and/or the first developer computing device 130 may display the security risk notification as part of step 221, e.g., in response to a user prompt to do so. For example, based on or in response to the one or more commands directing the administrator computing device 120 and/or the first developer computing device 130 to display an interface relating to the potential risk, an interface with one or more components relating to a security risk may subsequently be displayed.

Figure 4:
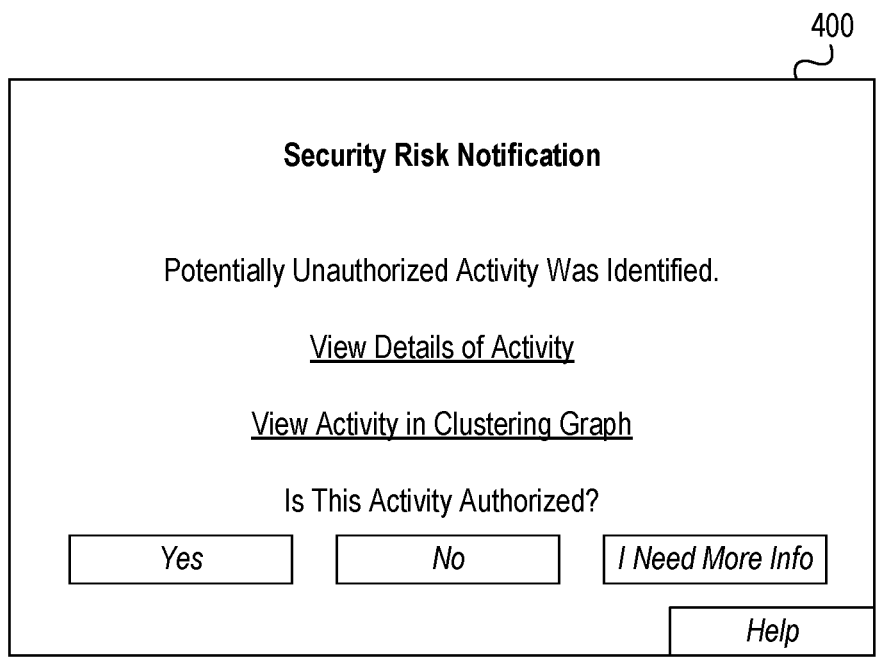

In some instances, the security risk notification transmitted at step 222 may cause the display of a security risk notification interface on the administrator computing device 120 with information related to the security risk, such as graphical user interface 400, which is depicted in FIG. 4. As seen in FIG. 4, graphical user interface 400 may include one or more user interface elements enabling a user of the administrator computing device 120 to display information associated with the security risk, such as details of the identified activity, depiction of the identified activity in a clustering graph based on the quantum knowledge graph, and the like. In some instances, the administrator computing device 120 may provide a message and/or other information corresponding to one or more aspects of the security risks. As seen in FIG. 4, graphical user interface 400 may include one or more user interface elements enabling a user of the administrator computing device 120 to identify whether the security risk is associated with unauthorized activity. The graphical user interface 400 may include one or more user interface elements enabling a user of administrator computing device 120 to view results data associated with the interaction flagged an anomalous and/or as an unverified interaction, and may further provide a selectable option to authorize the interaction or flag the interaction as unauthorized. In some instances, the displayed information may include, for each entry, application information, interaction information, container metadata, identified vulnerabilities, potential corrective actives, and the like.

At step 222, the first developer computing device 130 may transmit an authorization to the container security computing platform 110, e.g., upon receiving an input from a user associated with the first developer computing device 130 that the interaction related to the potential security risk is authorized. In some instances, the authorization may be transmitted at step 222 upon a user associated with the first developer computing device 130 selecting an option from a graphical user interface, such as the graphical user interface 400 of FIG. 4, that indicates that certain flagged activity is authorized. Various aspects of the authorization may be stored by the container security computing platform 110 for subsequent analysis and/or for refining techniques for identifying potential vulnerabilities and corrective actions, as will be described in more detail below. For example, the container security computing platform 110 may retrain a quantum knowledge to data related to the authorization to further refine factors for identifying potential vulnerabilities.

At step 223, the container security computing platform 110 may generate one or more updated NFTs and/or one or more updated smart contracts, based on receiving the authorization from the administrator computing device 120. In some examples, one or more NFTs and/or one or more smart contracts may be generated based on determining particular containers and/or interactions are authorized based on the authorization transmitted at step 222 and/or based on determining a lack of NFTs and/or smart contracts associated with a particular interaction between containers. In some instances, one or more NFTs and/or one or more smart contracts may be generated based on container interaction data stored locally at the container security computing platform 110, e.g., in the container monitor and security rule database 112b and/or obtained from a quantum knowledge graph generated using the quantum knowledge engine 112e. In some examples, generating one or more NFTs and/or one or more smart contracts at step 223 may further include performing one or more updates to a current enterprise security policy. In those instances, a verification of the one or more updates to the current enterprise security policy may be transmitted to the administrator computing device 120 as part of step 223. Subsequently, at step 224, the container security computing platform 110 may deploy one or more updated NFTs and/or one or more updated smart contracts to the container-based application host server 160. Steps 223 and 224 may be performed similar to step 211.

Now referring to FIG. 2G, at step 225, the administrator computing device 120 may receive an indication that a flagged interaction is not authorized. In some instances, the indication may be received at step 225 upon a user associated with the administrator computing device 120 selecting an option from a graphical user interface, such as the graphical user interface 400 of FIG. 4, that indicates that certain flagged activity is not authorized. Subsequently, at step 226, the administrator computing device 120 may transmit a security action notification to the container security computing platform 110. In some examples, the indication that the interaction is not authorized may be receiving as another computing device associated with an enterprise organization, such as the first developer computing device 130 or the second developer computing device 140, e.g., depending on user privileges associated with a user of an associated computing device, and that computing device may then transmit a security action notification at step 226.

In some instances, the security action notification may include a specific corrective action to take to address an identified unauthorized activity. In some examples, a corrective action may be identified by the container security computing platform 110 based on one or more factors such as a type of interaction flagged as unauthorized, enterprise security settings, previous corrective actions taken, user input from a developer or administrator computing device, and the like. addition to the first developer computing device 130 receiving input that the interaction related to Various aspects of the security action notification may be stored by the container security computing platform 110 for subsequent analysis and/or for refining techniques for identifying potential vulnerabilities and corrective actions, as will be described in more detail below. For example, the container security computing platform 110 may retrain a quantum knowledge to data related to the security action notification to further refine factors for identifying potential vulnerabilities.

At step 227, the container security computing platform 110 may generate and deploy one or more security updates to the container-based application host server 160, in response to the security action notification. In some instances, the security updates may include prohibiting specific interactions between containers and/or prohibiting activity of specific containers related to an interaction identified as unauthorized. In some examples, the security updates may include updates to one or more NFTs and/or one or more smart contracts, e.g., based on determining containers and/or interactions are unauthorized and/or based on determining a lack of NFTs and/or smart contracts associated with a particular interaction between containers. In some instances, security updates may be generated based on various container interaction data stored locally at the container security computing platform 110, e.g., in the container monitor and security rule database 112b and/or obtained from a quantum knowledge graph generated by the quantum knowledge engine 112e. In some examples, security updates generated and deployed at step 227 may include performing one or more updates to the current enterprise security policy.

In some instances, the security updates be determined based on a determined risk level associated with the security action notification. The risk level may be determined based on the type of potential vulnerability, based on preferences or other settings set by an enterprise organization, based on prior incidents associated with a type of potential vulnerability, based on a risk exposure level associated with the potential vulnerability, and the like. In some instances, determining the security updates may include determining a type of vulnerability of each of the identified unauthorized activity and determining security settings associated each type of vulnerability.

At step 228, the container security computing platform 110 may transmit a notification of security updates an enterprise computing device (e.g., administrator computing device 120) or user computing device (e.g., first developer computing device 130, second developer computing device 140). Additionally, in transmitting the notification of security updates at step 228, the container security computing platform 110 may generate a web-based user interface that may be used for investigating and/or researching the corrective action taken, as well as previously analyzed container interaction data (e.g., based on types of interactions, types of container applications, types of potential vulnerabilities, and the like) to query data based on common groupings and/or other information. By generating such an interface, the container security computing platform 110 may provide a full detailed view of analyzed container interaction data as part of identifying a suitable corrective action to respond to the security action notification.

In some instances, the container security computing platform 110 may generate one or more commands directing an enterprise computing device of the enterprise server infrastructure 150 or a user computing device, such as the first developer computing device 130 or the second developer computing device 140 to display the web-based user interface. The container security computing platform 110 may send the web-based user interface and the one or more commands directing the enterprise computing device or user computing device to display the web-based user interface via the communication interface 113.

An enterprise computing device (e.g., administrator computing device 120) or user computing device (e.g., first developer computing device 130, second developer computing device 140) may receive the web-based user interface and the one or more commands directing the computing device to display the web-based user interface. For example, an enterprise computing device (e.g., administrator computing device 120) or user computing device (e.g., first developer computing device 130, second developer computing device 140) may receive the web-based user interface and the one or more commands directing the computing device to display the web-based user interface responsive the enterprise computing device or user computing device sending instructions to the container security computing platform 110 for creation of the web-based user interface.

While graphical user interface 300 of FIG. 3 and the graphical user interface 400 of FIG. 4 are depicted for display on the administrator computing device 120 and/or the first developer computing device 130, similar graphical user interfaces may also be generated, displayed, and/or otherwise presented on other computing devices or systems, such as a computing device of the enterprise server infrastructure 150, container security computing platform 110, the second developer computing device 140, and the like.

Although a single container security computing platform 110 is described herein, any number of container security computing platforms may be implemented using one or more of the methods described herein without departing from the scope of the disclosure. Furthermore, although the user interfaces are described with regard to display at the administrator computing device 120 and/or the first developer computing device 130, the user interfaces may, in some instances, be displayed at a user device, such as the second developer computing device 140 or a personal computing device associated with the enterprise server infrastructure 150, without departing from the scope of the disclosure.

Figure 5:
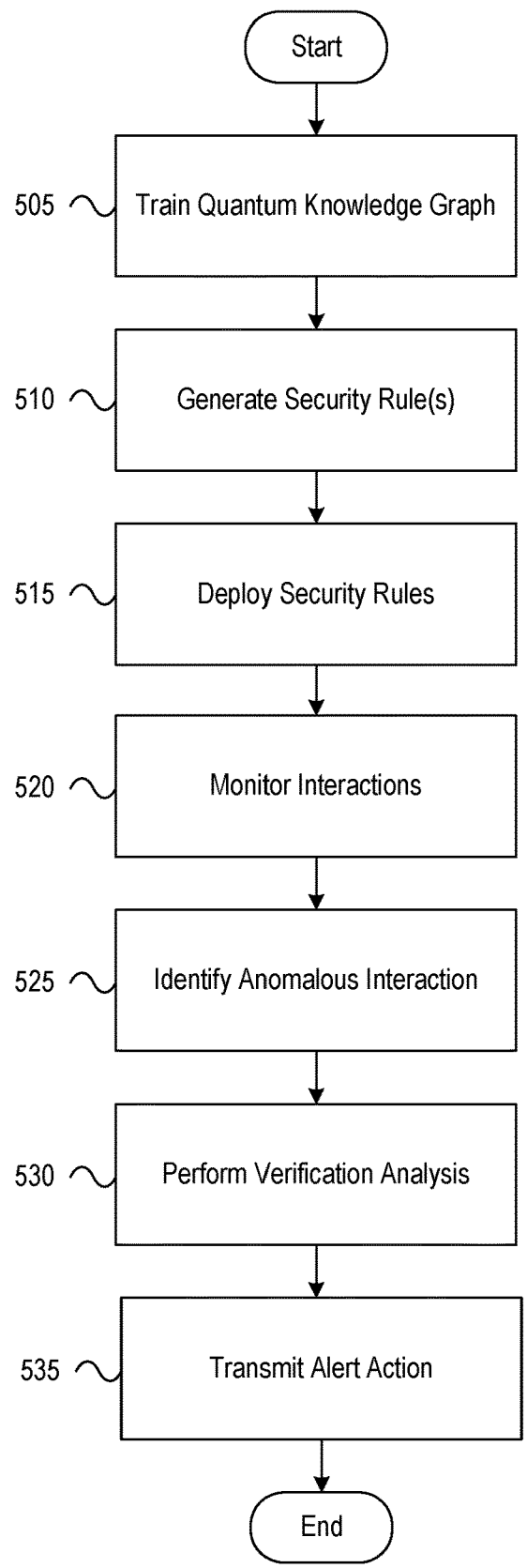
FIG. 5 depicts an illustrative method for monitoring container interactions and deploying security rules on a container-based computing infrastructure in accordance with one or more example embodiments.

FIG. 5 depicts an illustrative method for monitoring container interactions and deploying security rules on a container-based computing infrastructure in accordance with one or more example embodiments. Referring to FIG. 5, at step 505, a computing platform having at least one processor, a communication interface, and memory may train a quantum knowledge graph based on interactions in a container-based computing infrastructure. The interactions used for the quantum knowledge graph may be authorized interactions in the container-based computing infrastructure.

At step 510, the computing platform may generate one or more security rules based on the quantum knowledge graph. In some examples, the one or more security rules may relate to interactions in the container-based computing infrastructure and may be based on contextual information derived from the quantum knowledge graph. In some instances, generating one or more security rules may include automatically configuring and deploying a system of NFTs and smart contracts to the container-based computing infrastructure. At step 515, the computing platform deploy the one or more security rules to the container-based computing infrastructure.

At step 520, the computing platform may monitor interactions in the container-based computing infrastructure. At step 525, the computing platform may identify, using the quantum knowledge graph, an anomaly in a first interaction between containers in the container-based computing infrastructure.

Based on identifying an anomaly, at step 530, the computing platform may perform a verification analysis of the first interaction to determine a potential security risk. In some instances, performing the verification analysis of the first interaction may include identifying a smart contract associated with containers involved in the first interaction and authenticating the first interaction based on the smart contract. The smart contract may include a set of dynamic security rules relating to interactions between containers in the container-based computing infrastructure. In some instances, performing the verification analysis of the first interaction may include identifying one or more non-fungible tokens (NFTs) associated with containers involved in the first interaction and authenticating the containers involved in the first interaction based on the one or more NFTs. In such instances, each of the one or more NFTs may certify ownership of a respective container of the containers involved in the first interaction.

At step 535, the computing platform may then send, via the communication interface, an alert action relating to the potential security risk to an administrator computing platform. The alert action may be configured to be displayed on an interface of the administrator computing platform. In some instances, sending the alert action to the administrator computing platform may occur upon the computing platform determining that the potential security risk exceeds a risk threshold. In some instances, based on the potential security risk of the anomaly not exceeding a risk threshold, the method may further include generating and deploying an updated security rule to the container-based computing infrastructure and/or retraining the quantum knowledge graph based on at least the first interaction.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
train a quantum knowledge graph based on interactions in a container-based computing infrastructure;
generate one or more security rules associated with interactions in the container-based computing infrastructure based on the quantum knowledge graph;
deploy the one or more security rules to the container-based computing infrastructure;
monitor interactions between containers in the container-based computing infrastructure;

identify, using the quantum knowledge graph, an anomaly in a first interaction between a first container and a second container;
upon identifying the anomaly, perform a verification analysis of the first interaction to determine a potential security risk; and
based on the potential security risk, send, via the communication interface, to an administrator computing platform, an alert action configured to be displayed on an interface of the administrator computing platform.

2. The computing platform of claim 1, wherein performing the verification analysis of the first interaction includes identifying a smart contract associated with interactions between the first container and the second container and authenticating the first interaction based on the smart contract.

3. The computing platform of claim 1, wherein performing the verification analysis of the first interaction includes:
identifying a first non-fungible token (NFT) associated with the first container and a second NFT associated with the second container;
authenticating the first container based on the first NFT, wherein the first NFT is configured to certify ownership of the first container; and
authenticating the second container based on the second NFT, wherein the second NFT is configured to certify ownership of the second container.

4. The computing platform of claim 3, wherein the first NFT and the second NFT are controlled by least one smart contract that includes a set of dynamic security rules for interactions between containers.

5. The computing platform of claim 1, wherein the memory stores additional computer-readable instructions that, when executed by the at least one processor, cause the computing platform to:
based on the potential security risk of the anomaly not exceeding a risk threshold, generate and deploy an updated security rule to the container-based computing infrastructure.

6. The computing platform of claim 1, wherein identifying the anomaly in the first interaction between the first container and the second container includes analyzing container image metadata of the first container and the second container and determining that the first interaction is an anomaly based on the container image metadata and the one or more security rules.

7. The computing platform of claim 1, wherein training the quantum knowledge graph based on interactions in the container-based computing infrastructure includes capturing semantic information relating to interactions between containers.

8. The computing platform of claim 1, wherein generating one or more security rules includes automatically configuring and deploying a system of NFTs and smart contracts to the container-based computing infrastructure.

9. The computing platform of claim 1, wherein training the quantum knowledge graph includes deriving contextual data flow from the quantum knowledge graph using quantum machine learning algorithms.

10. The computing platform of claim 1, wherein the alert action is configured to cause interactions between the first container and the second container to stop.

11. The computing platform of claim 10, wherein the memory storing computer-readable instructions that, when executed by the at least one processor, further cause the computing platform to:

update the quantum knowledge graph based on ongoing interactions between containers in the container-based computing infrastructure and updates to one or more security rules for the container-based computing infrastructure.

12. A method comprising:
at a computing platform comprising at least one processor, a communication interface, and memory:
training a quantum knowledge graph based on interactions in a container-based computing infrastructure;
monitoring interactions between containers in the container-based computing infrastructure;
identifying, using the quantum knowledge graph, an anomaly in a first interaction between containers in the container-based computing infrastructure;
upon identifying the anomaly, performing a verification analysis of the first interaction to determine a potential security risk; and
sending, via the communication interface, to an administrator computing platform, an alert action relating to the potential security risk, wherein the alert action is configured to be displayed on an interface of the administrator computing platform.

13. The method of claim 12, further comprising:
generating one or more security rules relating to interactions in the container-based computing infrastructure based on the quantum knowledge graph; and
deploying the one or more security rules to the container-based computing infrastructure.

14. The method of claim 12, wherein sending the alert action to the administrator computing platform occurs upon determining that the potential security risk exceeds a risk threshold.

15. The method of claim 12, wherein performing the verification analysis of the first interaction includes identifying a smart contract associated with containers involved in the first interaction and authenticating the first interaction based on the smart contract, and wherein the smart contract includes a set of dynamic security rules relating to interactions between containers in the container-based computing infrastructure.

16. The method of claim 12, wherein performing the verification analysis of the first interaction includes identifying one or more non-fungible tokens (NFTs) associated with containers involved in the first interaction, and authenticating the containers involved in the first interaction based on the one or more NFTs, and wherein each of the one or more NFTs certify ownership of a respective container of the containers involved in the first interaction.

17. The method of claim 12, further comprising:
based on the potential security risk of the anomaly not exceeding a risk threshold, generating and deploying an updated security rule to the container-based computing infrastructure.

18. The method of claim 12, further comprising:
based on the potential security risk of the anomaly not exceeding a risk threshold, retraining the quantum knowledge graph based on at least the first interaction.

19. The method of claim 12, wherein generating one or more security rules includes automatically configuring and deploying a system of NFTs and smart contracts to the container-based computing infrastructure.

20. One or more non-transitory computer-readable media storing instructions that, when executed by a computing platform comprising at least one processor, a communication interface, and memory, cause the computing platform to:

train a quantum knowledge graph based on interactions in a container-based computing infrastructure;
monitor interactions between containers in the container-based computing infrastructure;
identify, using the quantum knowledge graph, an anomaly in a first interaction between a first container and a second container;
upon identifying the anomaly, perform a verification analysis of the first interaction to determine a level of potential security risk;
based on the level of potential security risk not exceeding a risk threshold:
    automatically generate and deploy one or more security rules to the container-based computing infrastructure; and
    retrain the quantum knowledge graph based on at least the first interaction; and
based on the level of potential security risk exceeding a risk threshold, send, via the communication interface, to an administrator computing platform, an alert action configured to be displayed on an interface of the administrator computing platform.

\* \* \* \* \*